United States Patent [19]

Auchterlonie

[11] 4,446,096

[45] May 1, 1984

[54] HIGH SPEED PLASMA FOCUS FUSION REACTOR

[76] Inventor: Richard C. Auchterlonie, 5701 N. Sheridan #29-q, Chicago, Ill. 60660

[21] Appl. No.: 325,321

[22] Filed: Nov. 27, 1981

[51] Int. Cl.³ .............................................. G21B 1/00
[52] U.S. Cl. ..................................... 376/145; 376/142
[58] Field of Search ........................ 376/144, 142, 145

[56] References Cited

U.S. PATENT DOCUMENTS

| | | | |
|---|---|---|---|
| 2,979,639 | 4/1961 | Williams et al. | 315/127 |
| 3,533,910 | 10/1970 | Hirsch | 376/145 |
| 3,766,004 | 10/1973 | Roberts et al. | 376/145 |

OTHER PUBLICATIONS

Plasma Physics, vol. 22, pp. 245–260, Pergamon Press, Decker et al. (1980), "Current and Neutron Scaling of Fast H.V. Plasma Focus".
Plasma Physics, vol. 20, pp. 95-14 106 (1978), Harries et al., "Trajectories of High Energy Electrons in a Plasma Focus".
IEEE Spectrum (12/80), pp. 44–50, "Magnetic Fusion Power".
High Speed Pulse Technology, Academic Press, NY, vol. 1, pp. 36–44 (1965).
J. Opt. Soc. Am., vol. 51, No. 5 (5/61), pp. 543–547, Fischer.
WASH 1277, 2nd ED., pp. 26–31.
Radio–Electronics, (2/81), pp. 47–49, Golka, "Project Tesla".
Science, (9/7/79), vol. 205, No. 4410, pp. 959–964, Kapitza.
UCRL–51872, Zucker et al., "Design of a Repetitively Pulsed Megajoule Dense-Plasma Focus," Aug. 1, 1975.
UCRL–76091, Zucker & Bostick, "Theoretical and Practical Aspects of Energy Storage and Compression," Apr. 7, 1975.
UCRL–80047, O. S. Zucker, "General Considerations of Energy Compression," Nov. 15, 1977.
UCRL–77652, Zucker et al., "Repetitively Pulsed Capacitor Bank for the Dense-Plasma Focus," Dec. 1975.
Winston Bostick, "The Pinch Effect Revisited," Int. Journal of fusion Energy, vol. 1, No. 1, pp. 1–55, Mar. 1977.
Bostick et al., "X-ray fine structure of Dense Plasma in a Co-axial Accellerator," J. of Plasma Physics, vol. 8, pp. 7–20, 1972.
F. Frungel, High Speed Pulse Technology, 1965, vol. 182 at 36–44, 393–401, FIGS. A7-3, A8-1, G8c-2.
Glasstone, Controlled Nuclear Fusion (1968 Rev.), pp. 24–25.

Primary Examiner—Sal Cangiglosi
Attorney, Agent, or Firm—R. C. Auchterlonie

[57] ABSTRACT

An electrical discharge thermonuclear reactor having a capacitor which is discharged into a reaction chamber through a low inductance distribution circuit funneling discharge current to a focus point in the reaction chamber so that the magnitude of the magnetic field intensity associated with the discharge current is generally inversely proportional to the square of the distance from the focus point. Then the circuit inductance is limited to an minimum value regardless of the absolute maximum distance from the capacitor to the focus point and thus the size of the capacitor. The distribution circuit has two outward-branching, interpenetrating three dimensional circuit networks of opposite polarity conveniently fabricated by stacking conductor plates having a generally cylindrical geometry. The distribution circuit spherically surrounds the reaction chamber so far as is practical so that the discharge rate, power and energy transfer to the reaction chamber are maximized and thus reducing the required size of the reactor.

24 Claims, 19 Drawing Figures

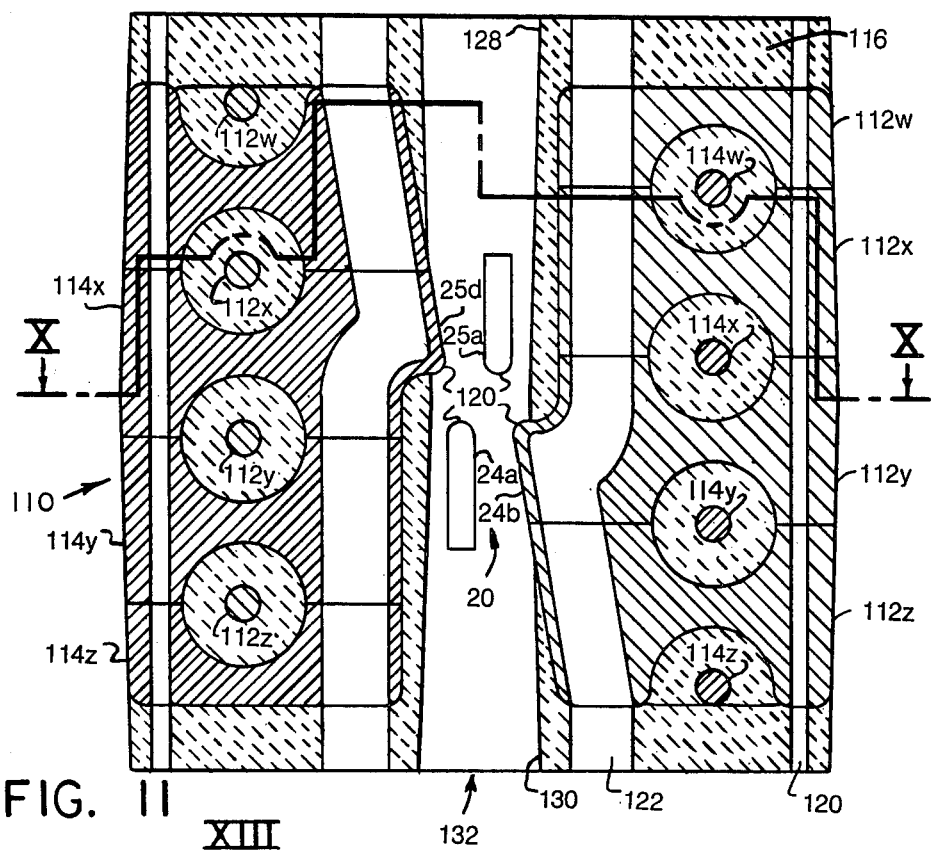
FIG. 11
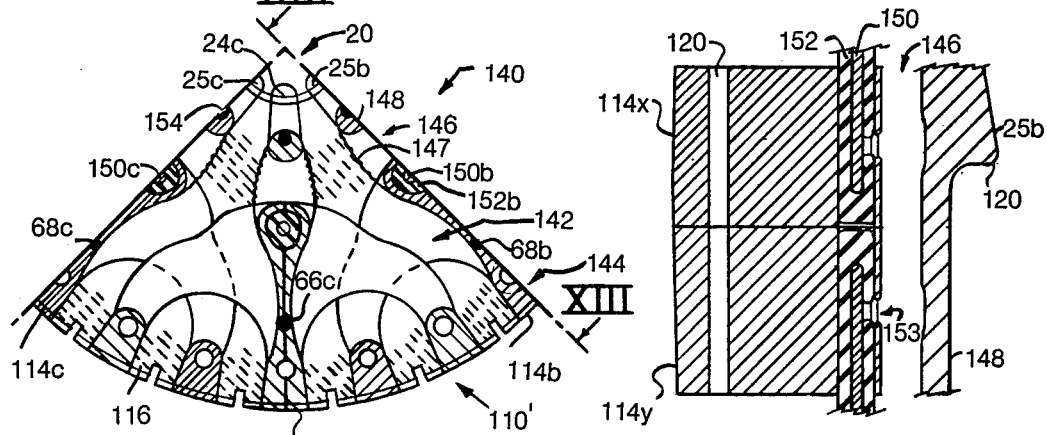
FIG. 12
FIG. 13
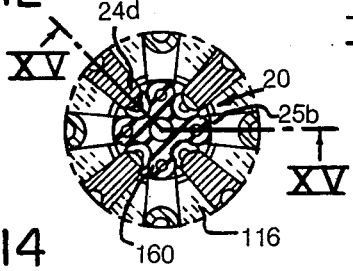
FIG. 14
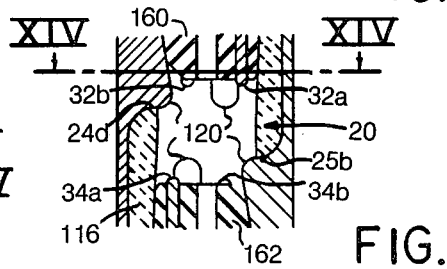
FIG. 15

HIGH SPEED PLASMA FOCUS FUSION REACTOR

BACKGROUND OF THE INVENTION

1. Field of the Invention

This invention is related to the field of fusion nuclear reactors and neutron generators. More specifically the invention is related to the "plasma focus" thermonuclear reactor in which a high speed pulsed electrical discharge heats, compresses, and concentrates a plasma of thermonuclear fuel at a focus point within a reaction chamber.

Fusion reactors may burn deuterium, a naturally occurring isotope of hydrogen which is easily obtained from water, and do not produce radioactive waste. Fusion reactors cannot melt down. The high temperature of the fusion process permits increased conversion efficiency to electrical power, including the possibility of direct conversion from microwaves generated by the plasma ions. Neutrons are a useful byproduct of the deuterium fusion reaction and may be used to convert lithium to tritium, fertile uranium to plutonium, thorium to fissile uranium, or radioactive waste to less harmful isotopes. But unlike fission reactors, fusion reactors need not produce neutrons if a boron-hydrogen fuel is used.

Plasma focus fusion reactors offer several inherent advantages over magnetic confinement schemes using external superconducting magnets or electromagnets. The pressure of the gas fuel in the reaction chamber may be on the order of atmospheric pressure and thus high-vacuum seals are not needed. The power density of the reactor is much higher and thus the reaction chamber may be much smaller. Since the electrical discharge provides the confining magnetic field and simultaneously heats the plasma, there is no inherent need for external means for heating the plasma to the reaction temperature, and there are no external electromagnets with resistive losses. The confining magnetic field of the electrical discharge is also much higher than the maximum possible fields produced by superconducting magnets, and thus there is no inherent need to burn a tritium-deuterium fuel which fuses at the lowest temperature and density-confinement product. The use of tritium is undesirable since tritium is an artificial radioactive isotope.

2. Description of the Prior Art (Rule 97 Prior Art Statement)

A summary of the prior art for magnetic confinement fusion reactors in general is provided in E. Lerner, "Magnetic Fusion Power," *IEEE Spectrum*, Vol. 17, No. 12, December 1980 at 44. Mr. Lerner discloses that controlled thermonuclear fusion power using magnetic confinement now seems practical, but the best method remains uncertain. Mr. Lerner further discloses that the plasma focus is undoubtedly the simplest of all fusion devices, and neutron energy released by the focus increases as the fifth power of the input current, implying that breakeven devices could be built that use relatively small energy sources of 4 MJ. The Soviet Union has taken a keen interest in the focus and is currently building a 2.5 MJ device at the Kurchatov Institute, which is at least ten times larger than focus devices under construction in the United States.

Mr. Lerner's article also discloses a reasonable explanation of why the focus device, consisting of two oppositely charged coaxial electrodes, achieves appreciably better results than pinched sparks in general. In the focus device current filament pairs roll down the length of the coaxial electrodes and, at the end of the electrode, begin to merge and annihilate each other. The extremely rapid change of magnetic field induces very high electric fields, over 100 MV/cm, accelerating ions to 300 to 400 keV. The resulting high current, carried by the few survivor filaments, creates compressional fields of 60 KT or more, compressing the plasma to densities of $10^{20}/cm^3$. For several nanoseconds, thermonuclear reactions occur within the filaments, about 20 micrometers in diameter, which in turn are composed of even smaller components only a micrometer in diameter.

Plasma focus fusion devices at first used hemispherical electrodes which were electrically connected via a coplanar, circular plate transmission line to a bank of capacitors generally radially disposed about the electrodes. An excellent summary of plasma focus devices and design techniques circa 1965 is provided in F. Frungel, *High Speed Pulse Technology*, 1965 Academic Press, Lib. Cong. 65-16665, Vol. 1 & 2 at 36–44, 393–401, FIGS. A7-3, A8-1, G8c-2. Frungel teaches that the leads that carry the current from the capacitor to the discharge gap should be designed to keep the parasitic inductance of the circuit down to a minimum since the parasitic inductance restricts the magnitude of the current and its rate of growth. The problem of obtaining low inductance in parallel-connected capacitors lies not in the capacitors themselves but in the arrangement of the connections. Bifilar construction of the bus bars is necessary. Current growth up to $10^{12}$ amp./sec. is possible.

Normally the generation of "pinched" sparks, in which a plasma is heated and compressed by a fast increase in current density, requires at least 5 KJ of stored energy, but H. Fischer designed an electrical discharge device for photographic work with an extremely small circuit inductance that achieved a pinched spark with only 0.05 J. A generally cylindrical, coaxial capacitor formed in the shape of a test tube was provided with an aperture at the bottom at which a electrical discharge occurred at an electrode protruding through the aperture. H. Fischer, "Millimicrosecond Light Source With Increased Brightness," *Journal of the Optical Society of America*, Vol. 51, No. 5, May 1961, at 543.

After 1965 several very large megajoule capacitor banks were constructed for experimental use with induced field pinch devices, in which the capacitor bank is discharged into an external electromagnet. Switching is permormed by a spark gap switch on each capacitor, connecting the capacitor to a coaxial transmission line. The transmission lines are terminated at right angles to and above and below a circular plate transmission line feeding a centrally located fushion device. *Survey of the USAEC Program in Controlled Thermonuclear Research*, 2ed, U.S. Atomic Energy Com'n, Division of Controlled Thermonuclear Research, at 26–31 (WASH 1277 UC-20).

T. Roberts et al., U.S. Pat. No. 3,766,004 issued Oct. 16, 1973, discloses the use of a carbon dioxide laser to provide additional heating of the plasma in a plasma focus device and also discloses a focus device with a circular plate geometry, in FIG. 2. Roberts finds the circular plate geometry useful for localizing the focus point so that it is collinear with the axis of the laser.

Roberts also discloses that even relatively small increases in the temperature of the plasma yields a significant increase in the rate of neutron production.

Electrical discharges have also been useful for machining. E. Williams and C. Porterfield, U.S. Pat. No. 2,979,639 issued Apr. 11, 1961 discloses increasing the capacitor voltage as an attractive approach to higher power and metal removal rates.

SUMMARY OF THE INVENTION

It is the general aim of the invention to provide an improved method and geometry for arranging electrical connections from capacitors to the electrodes in an plasma focus device to minimize effective inductance and thus increase the maximum current available from a given total capacitance and voltage level of a capacitor bank.

Another object of the invention is to provide an improved geometry of connections from a capacitor bank of a given voltage to the electrodes in an electrical discharge device to achieve a maximum rate of increase in current supplied to the discharge electrodes.

Yet another object of the invention is to provide an improved means for supplying a high current pulse to a plasma focus fusion reactor in which the rate of current increase is maximized, thus increasing the temperature of the plasma at the focus point and substantially increasing the rate of neutron production for a given maximum current.

Still another object of the invention is to provide a circuit for distributing current from a capacitor bank to an plasma focus fusion reactor with an effective inductance that decreases in direct proportion to the size of the reaction chamber, thereby delivering a higher maximum current to a smaller reactor and permitting breakeven for smaller reactors at reduced capacitor bank energies.

It is also an object of the invention to provide an improved geometrical arrangement of electrodes in the reaction chamber of an plasma focus fusion device to minimize the effective inductance in the discharge circuit.

Moreover, another object of the invention is to provide an efficient DC power supply capable of generating the extremely high voltages needed for minimizing the size of the capacitor bank.

In accordance with the present invention, an improved three dimensional electrical circuit, called a "distribution bus," is provided for arranging the connections in the capacitor bank to the electrodes in the reaction chamber of a plasma focus fusion reactor so that the rate of increase of current and maximum discharge current are maximized. The distribution bus has two interpenetrating three dimensional, or "lattice," circuit networks of opposite polarity, one carrying current into the reaction chamber, and the other carrying current out of the reaction chamber, having generally an inverse-square, or "spatial," divergence in current density, and thus magnetic field, as a function of radial distance from the reaction chamber, so that the circuit inductance is limited to a absolute minimum value regardless of the maximum radial distance and thus size of the capacitor bank. A cylindrical geometry distribution bus having an increasing number of alternately axial, or "vertical," and perpendicular, or "horizontal," conductor bus elements as a function of the outward radial distance, is conveniently fabricated by stacking horizontal conductor plates and interposing a dielectric between them. The central, or "core," section of the distribution bus is conveniently fabricated as a unitary body of refractory metal and ceramic insulator.

Many details of construction concerning the power supply, control, thermal loop and maintenance requirements of a commercial thermonuclear reactor providing fission fuel breeding and electrical or propulsion power are disclosed, including an improved efficiency extra high voltage DC power supply using full-wave rectifier diodes built into a resonant, or "Tesla," coil to avoid capacitive end loading.

BRIEF DESCRIPTION OF THE DRAWINGS

Other objects and advantages of the invention will become apparent upon reading the following detailed description and upon reference to the drawings in which:

FIG. 11 is an elevation section of the distribution bus core of FIG. 10 along section line XI—XI;

FIG. 12 is a quarter sector of the core of FIG. 10 showing modifications for building spark-gap switches into the first vertical bus elements;

FIG. 13 is an elevation section view of the modified core of FIG. 12 along section line XII—XII further showing dual injector electrodes;

FIG. 14 is a plan section view of the central area of the core of FIG. 10 along section line XIV—XIV in FIG. 15 illustrating initiator electrodes in the reaction chamber;

FIG. 15 is an elevation section view along section line XV—XV in FIG. 14;

Figure 1:
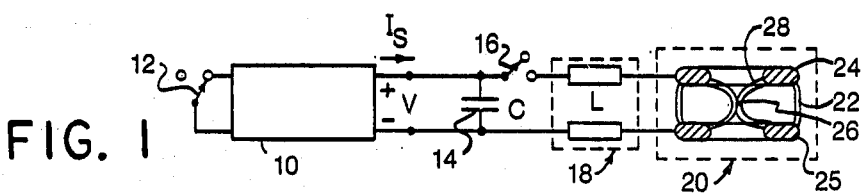
FIG. 1 is a most basic schematic diagram of an electrical discharge circuit using the distribution bus.

While the invention is susceptible of various modifications and alternative constructions, a certain preferred embodiment has been shown in the drawings and will be described below in considerable detail. It should be understood, however, that there is no intention to limit the invention to the specific form described but, on the contrary, the invention is to cover all modifications, alternative constructions and equivalents falling within the scope of the appended claims.

DESCRIPTION OF THE PREFERRED EMBODIMENT

Turning now to the drawings, FIG. 1 shows in schematic form an electrical discharge device having a power supply (10) turned on by a switch (12). The power supply (10) pumps charge in the form of a generally continuous current (Is) into a charge-storing capacitor (14) of capacitance value (C) against an opposing voltage (V) generated by the accumulation of charge (Q=(C)(V)) in the capacitor (14). The power supply (10) is preferably a DC supply described in detail infra, although an AC supply in the form of a step-up transformer driven at the resonate frequency of (C) and the inductance of the transformer's secondary coil, known to persons skilled in the art as a high voltage, power frequency resonant power supply, could also be used.

After the capacitor (14) is charged, a switching device (16) is closed completing a low inductance discharge path through a distribution bus according to the instant invention generally designated (18) which funnels electrical energy from the capacitor (14) to an electrical discharge receiving device generally designated (20) shown as a plasma focus fusion reaction chamber containing a fuel gas such as deuterium and having a coplanar, coaxial ring geometry devised for minimum discharge inductance. It should be understood, however, that the advantages of the present invention are equally useful for other discharge receiving devices including but not limited to external field pinch effect thermonuclear reactors, lasers, and exploding wire devices.

In the reaction chamber (20) a plasma discharge (22) starts at the outer periphery of the ring-shaped electrodes (24), (25) and collapses radially inward toward a central focus point (26) while maintaining a low inductance plasma discharge geometry (28). At the focus point (26) the magnitude of the discharge current and its rate of increase, maximized by the low inductance (L) of the discharge path from the capacitor (14) through the switching device (16), distribution bus (18), electrodes (24), (25) and plasma discharge (28), causes a pinching of the plasma (28) in which the plasm density increases due to electrodynamic, mutual magnetic attraction of the plasma electrons and ions comprising the discharge (28) current. The pinch effect provides magnetic confinement of the plasma discharge (28) near the focus (26) at sufficient densities for a sufficient period of time for substantial fusion reactions to occur, and the increased plasma density decreases the thermal equilibrium time for the kenetic energy of hot electrons to be transferred to the cooler, more massive plasma ions.

The pinch effect, however, is not sufficient to guarantee that thermonuclear reactions will occur since the plasma (28) must be heated to temperature on the order of 100 Kev as well as confined. Unlike mechanical compression of a gas, magnetic compression by the pinch effect does not heat the plasma since magnetic forces cannot do work on electric charges; the Lorentz force vector is always perpendicular to the velocity vector of the electric charges. But it is also true that the pinch effect is always associated with an increase in plasma temperature. The ohmic resistance of the plasma decreases inversely with temperature and thus inversely as a function of current. This negative resistance effect always assures that the ohmic resistance of the discharge path is relatively small in comparison to the total inductance (L). Thus a relatively low inductance in relation to the magnitude of the current required for the pinch effect to occur also guarantees that the ohmic resistance of the discharge path will be relatively low and thus the temperature of the pinched plasma will be relatively high. But in quantitative terms the line integral of the electric field must be equal to 100 Kev for cold plasma ions at the end of a linear pinch to be ohmicly heated to 100 Kev. Even if the capacitor voltage (V) was 100 Kv during discharge, the line integral of the electric field would not be 100 Kv since discharge is not a steady-state process; the increasing magnetic field induces an opposing electric field. Thus ohmic heating in a linear pinch should require low inductance (L), high discharge current, and high voltage (V).

The plasma focus device, however, does achieve fusion reactions without voltages (V) in excess of 100 Kv. The analysis above indicates that the heating must be due to solenoidal electric fields induced by rapid changes in the magnetic fields associated with the discharge current. It is submitted that the rapid changes in magnetic field are generated by the merging of current filaments near the focus point (26) when the plasma discharge (22) collapses to the pinched geometry (28). The merging of current filaments must be distinguished from the mere collapse or pinching of a single filament. Mere pinching is a more or less continuous process in which electrical energy from an impressed electric field is converted to the new magnetic field circumferentially enclosing the pinched current. But during the merging of current filaments, the current filaments initially present a non-radially symmetric current distribution so that the current filaments rapidly collapse radially inward toward a radially symmetric current distribution (28) causing nearly instantaneous changes in current density and magnetic field that induce solenoidal electric fields that quickly heat the plasma to thermonuclear temperature for ignition of the plasma. The practical problem at hand, then, is the optimum arrangement of the hardware in FIG. 1 for delivering intense discharge currents as rapidly as possible to the focus point (26).

Figure 2:
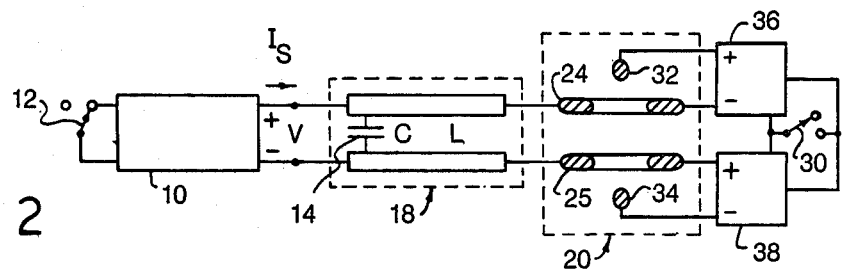
FIG. 2 is an alternative embodiment in which the capacitance of the distribution bus is significant and switching occurs in the reaction chamber.

Turning now to FIG. 2, there is shown an alternative embodiment in which the switching device (16) of FIG. 1 is made an integral part of the reaction chamber (20). A switch (30) initiates the plasma discharge (22) by triggering pulse generators (36), (38) which pulse initiator electrodes (32), (34), respectively, in the reaction chamber (20). Since the capacitor (14) and the distribution bus (18) are directly connected to each other, the distributed capacitance of the distribution bus (18) also functions as a charge storage means and thus there need not be any physical separation between the distribution bus (18) and the capacitor (14). In fact, the switching device (16) in FIG. 1 may be placed anywhere in the discharge path.

Figure 3:
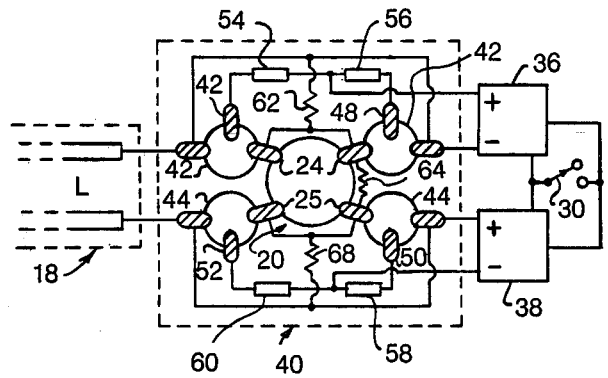
FIG. 3 illustrates the use of spark-gap switches surrounding the reaction chamber with multiple initiator electrodes and switches immediately in series with both the positive and negative reaction chamber electrodes.

FIG. 3 illustrates that spark-gap switches (42), (44) may be assembled circumferentially around the reaction chamber (20) forming a reactor and switch assembly (40). The spark-gap switches have multiple initiator electrodes (46), (48), (50), (52) fed by the pulse generators (36), (38) through isolation impedances (54), (56), (58), (60). Note that there is both a positive spark-gap switch (42) and a negative spark-gap switch (44) and equalization resistors (62), (64), (68) insure that the voltage (V) is shared between the switches (42), (44). The resistor (64) is used so that the reaction chamber (20) will also function as a switch to any extent possible. The total inductance of the switches and the dielectric gas pressure in the spark-gap switches may be minimized by using multiple switches in this fashion.

Figure 6:
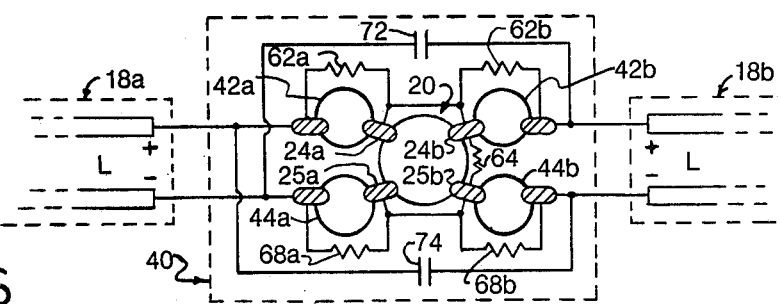
FIG. 6 illustrates the use of a sectored distribution bus having regenerative parasitic capacitance aiding uniform breakdown of spark-gap switches surrounding the reaction chamber.

FIG. 6 illustrates that the reaction chamber (20) and spark-gap switches (42), (44) need not be circumferentially symmetrical about an axis through the focus point (26). The reaction chamber electrodes (24), (25), spark-gap switches (42), (44), and distribution bus (18) is shown sectored into duplicate, electrically isolated sections designated by the suffixes (a) and (b) on the reference numerals. Sectoring ensures that the plasma discharge (22) in FIG. 1 will remain symmetrical by preventing current hogging at particular places on the electrodes (24), (25) and also aids uniform turn-on of the spark-gap switches (42), (44). In fact, the parasitic capacitance (72), (74) between the sectors (a), (b) can be cross-coupled as shown to aid simultaneous breakdown since when the spark-gap in one sector breaks down the voltage drop across the spark-gap is cross-coupled to generate an increase in voltage across the gaps in the other sectors.

The optimum geometry for the circuits may be mathematically derived and as background for the derivation it is instructive to first consider the well-known prior art methods of analysis and characterization of electrical discharge devices. It is known that the maximum rate of increase in discharge current (I) is:

$$dI/dt_{max} = V/L \tag{1}$$

The maximum discharge current (Imax) is:

$$I_{max} = V\sqrt{C/L} \tag{2}$$

which occurs a period of time (T) after the discharge starts:

$$T = (\pi/2)\sqrt{LC} \tag{3}$$

The capacitance (C) is related to the energy (W) stored in the capacitor (14) as:

$$W = \tfrac{1}{2}CV^2 \tag{4}$$

Taken together, these equations show that the ratio of (V/L) should be maximized.

Figure 4:
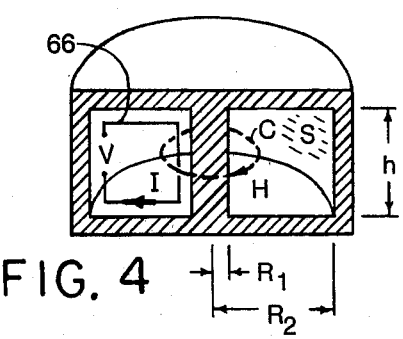
FIG. 4, labeled PRIOR ART, is a coaxial transmission line section for illustrating the well-known method of inductance calculation and calculating the properties of prior art parallel-plate transmission lines.

The inductance (L) is the most elusive parameter since it is related to overall geometry in an obscure fashion. To illustrate, FIG. 4, labeled PRIOR ART, shows a coaxial transmission line segment of length (h), inner radius (R1) and outer radius (R2), configured for the calculation of inductance along a discharge path (66). FIG. 4 is a model, for example, of an electrical discharge receiving device driven by a parallel plate transmission line. According to the traditional method of inductance calculation, the electrical path (66) bounds a surface (S) shown as having dimensions (h) X (R2−R1). The inductance (L) is independent of the particular surface (S) selected and is defined as the ratio of the total magnetic flux ($\Phi_B$) normal to the surface (S) over the current (I). Both the magnetic flux ($\Phi_B$) and the current (I) may be expressed in terms of the magnetic field intensity vector (H) via the permeability of free space ($\mu$) with respect to a closed path (C) encircling the current (I):

$$L \equiv \frac{\Phi_B}{I} = \frac{\mu \int^S \int H \cdot dS}{\int_C H \cdot dl_C} \tag{5}$$

The magnetic field intensity vector (H) can be eliminated by selection of the closed path (C) having sufficient symmetry so that the integrations may be analytically performed;

$$I = \int_0^{2\pi} Hr d\theta = 2\pi r H \tag{6}$$

$$\therefore H = I/2\pi r \tag{7}$$

$$\Phi_B = \mu \int_0^h \int_{R_1}^{R_2} H \, dr \, dz \tag{8}$$

$$\Phi_B = \frac{\mu h I}{2\pi} \int_{R_1}^{R_2} \frac{dr}{r} \tag{9}$$

$$\Phi_B = \frac{\mu h I}{2\pi} \ln\left(\frac{R_2}{R_1}\right) \tag{10}$$

$$L = \frac{\mu h}{2\pi} \ln\left(\frac{R_2}{R_1}\right) \quad \text{(PRIOR ART)} \tag{11}$$

$$\text{But then } \frac{V}{L} = \frac{2\pi E_{max}}{\mu \ln(R_2/R_1)} \quad (!) \tag{12}$$

The result shows that the electric field (E) should be as high as possible, (Emax), and (R2) should not be many times larger than (R1).

Figure 5:
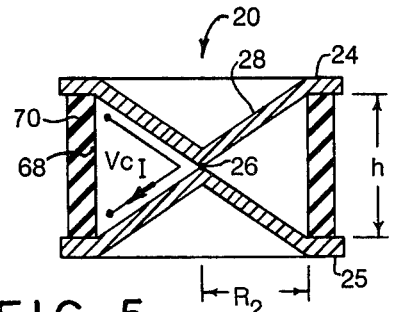
FIG. 5 is a pictoral model of a reaction chamber circuit giving a maximum rate of increase in discharge current.

FIG. 5 is an electrical model of the plasma discharge (28) in the reaction chamber (20) of FIG. 1. The outer radius (R2) is the internal dimension of the cylindrical wall (68) of the reaction chamber's insulator (70) separating the positive electrode (24) from the negative electrode (25). The inductance (Lc) of the discharge (28) is calculated as:

$$\Phi_B = 2\mu \int_0^{\tfrac{1}{2}h} \left[ \int_{\tfrac{2zR_2}{h}}^{R_2} \frac{I}{2\pi r} dr \right] dz \tag{13}$$

$$\Phi_B = \frac{\mu I}{\pi} \int_0^{\frac{1}{2}h} \ln\left(\frac{h}{2z}\right) dz \tag{14}$$

Changing variables of integration to (y=2z/h), (dz=(h/2)dy):

$$\Phi_B = \frac{\mu Ih}{2\pi} \int_0^1 \ln\left(\frac{1}{y}\right) dy \tag{15}$$

$$\Phi_B = (\mu Ih)/2\pi \tag{16}$$

$$Lc = \mu h/2\pi \tag{17}$$

$$Vc/Lc = (2\pi E_{max})/\mu \tag{18}$$

Comparing equation 11 to equation 17 shows that a parallel plate transmission line of circular geometry is unsuitable for distributing current to the plasma-focus reaction chamber (20), since for even a ratio of (R2/R1)=3 the inductance of the transmission line (L) is greater than the inductance (Lc) of the plasma discharge (28). Maximum power transfer occurs when the impedances of a load and source are matched, and maximum energy transfer requires that the impedance of the load is greater than the impedance of the source. In the instant situation the source impedance is approximately (L) and the load impedance after collapse of the initial plasma discharge (22) to the pinched discharge (28) is (Lc). The ratio of experimentally measured values of (V/L) compared to the theoretical value of (Vc/Lc) of equation 18 is a measure of the inefficiency of prior art plasma focus devices. For an (Emax) of 500 volts per mill, or 20 Kv per mm, characteristic of fused quartz and some other ceramics, equation 18 gives a theoretical numerical value of:

$$V/L = (2)(\pi)(500 \text{ v/mill})(1000 \text{ mill/in})/((2.54 \text{ cm/in})(1.26 \times 10^{**}-6 \text{ H/m}))$$

$$= 1.0 \times 10^{**}14 \text{ A/s}.$$

Note that this is one hundred times greater than the reported 1 MA discharges in 1 μs, so that these prior art devices are about 0.01% efficient at transferring energy and power to a focus point (26).

According to the present invention, a distribution bus (18) has sufficiently low inductance (L) so that power and energy is efficiently transferred to the focus point (26). An analytical description of the inductance (L) of the distribution bus (18), however, requires a departure from the traditional method described above. The distribution bus (18) is, generally speaking, a three-dimensional, interpenetrating electrical circuit so that neither a bounded surface (S) nor a closed path (C) with sufficiently high symmetry may in general be found. Instead, one may generally assume that the inductance (L) is distributed generally spherically about the focus point (26). Noting that the energy in an inductor is:

$$W = \frac{1}{2}LI^2 \tag{19}$$

and the energy is distributed as:

$$W = \int_{-\infty}^{\infty} \int_{-\infty}^{\infty} \int_{-\infty}^{\infty} \frac{1}{2}\mu|\vec{H}|^2 \, dx \, dy \, dz \tag{20}$$

$$L = \mu \int_{-\infty}^{\infty} \int_{-\infty}^{\infty} \int_{-\infty}^{\infty} \frac{|\vec{H}|^2}{I^2} \, dx \, dy \, dz \tag{21}$$

Suppose that the current (I) diverges as the inverse square of the outward radius (r) from the focus point (26). The current must flow both toward and away from the focus point (26) along the surfaces of conductors. Assuming a generally uniform conductor surface spacing of (a) and a percentage (f) of space that is not filled by conductors, then:

$$J(r) = I/(4\pi r^2) \tag{22}$$

$$H = (aJ)/f \tag{23}$$

$$H(r) = (aI)/(4\pi r^2 f) \tag{24}$$

$$L = \mu f \int \int \left(\frac{a}{4\pi r^2 f}\right)^2 dv \tag{25}$$

$$L = \frac{\mu a^2}{16\pi^2 f} \int_0^\pi \int_0^{2\pi} \int_a^\infty \frac{1}{r^4} r^2 \sin\phi \, d\phi \, d\theta \, dr \tag{26}$$

$$L = \frac{\mu a^2}{4\pi f} \int_a^\infty \frac{1}{r^2} dr \tag{27}$$

$$L = (\mu a)/(4\pi f) \tag{28}$$

$$V/L = (4\pi f e_{max})/\mu \tag{29}$$

Comparing equations 28 and 29 to equations 17 and 18 reveals that if 50% of the space in the distribution bus (18) is conductor, and (h) is approximately equal to (a), then the impedance of the distribution bus (18) will match the impedance of the reaction chamber (20) to maximize power transfer. This is true regardless of the magnitude of (a), and thus small reactors may be fabricated having the same maximum dI/dt as large reactors, contrary to prior art devices requiring high discharge energies for pinching to occur. Moreover, for small reaction chambers (20) the voltage (V) of an equivalent energy (W) capacitor (C) is lower, so that the maximum current (Imax) is higher than for large reaction chambers (20). But there are other factors, such as reduced ohmic heating caused by increased end loss, excessive discharge machining of electrode tips, excessive magnetic force on the conductors, and reduced thermal conversion efficiency, that dictate that a resonably large reaction chamber (20) should be used.

Comparing equations (9) and (10) to equations (27) and (28) shows that the improvement over the prior art is due to the fact that an inverse square divergence in magnetic field results in a minimal and bounded inductance regardless of the radial extent of the distribution bus while merely an inverse divergence does not result in a bounded indutance. This is a result of the fact that the integral of (1/r) squared is (−1/r) while the integral of (1/r) is (ln(r)). The inverse square divergence in magnetic field results in an inductance that is a absolute minimum as well as bounded since the current density (J) cannot diverge any faster than as the inverse square of the outward radial distance since all of the current flowing through the bus is delivered to the reaction chamber (20) and higher powers of (1/r) are not solutions of the conservation of current equation:

$$\nabla \cdot \vec{J} = -(\partial \rho / \partial t) \therefore 0 \approx (1/r^2)(\partial/\partial r)(r^2 J r) \qquad (30)$$

The inductance of the distribution bus (18) is, by the $\int (1/r^2) dr$, proportionately concentrated as (1/r) toward the central areas, and thus considerable effort should be directed toward interfacing the distribution bus (18) to the reaction chamber electrodes (24), (25) in a fashion having minimal inductance.

Figure 7:
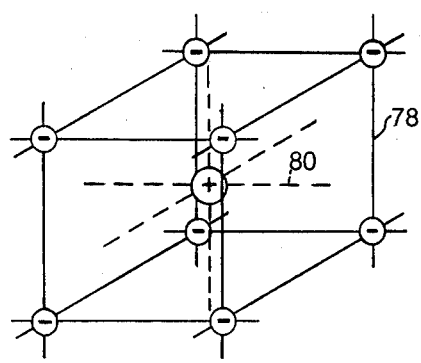
FIG. 7, labeled PRIOR ART, is a schematic of the cesium chloride lattice.

A starting point for the physical structure of the distribution bus is a particular three dimensional lattice, or arrangement of points, labeled PRIOR ART in FIG. 7, known as the cesium chloride lattice. Cesium chloride crystalizes in the form shown having two interpenetrating cubic lattices of opposite ionic polarity. The cesium chloride lattice may be converted to an interpenetrating electrical circuit by using the lattice points as the centers of circuit nodes and connecting the nearest neighbors of like ionic polarity to form circuit branches. Then conductor surfaces are determined by selecting the points that are proportionately spaced close to the positive branches or the negative branches but while keeping the separation (a) between the positive and negative conductor surfaces constant.

Figure 8:
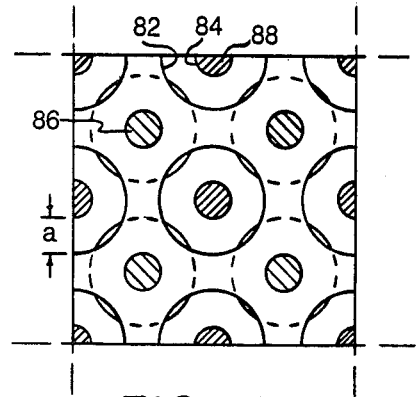
FIG. 8 is a section view along a (100) crystallographic plane of a distribution bus having an underlying cesium chloride lattice.

In FIG. 8, for example, the positive conductor surfaces (82) are spaced from the positive branches (80) by ¼ of the nearest distance between the positive branches (80) and the negative branches (78) along the direction of closest approach. The negative conductor surfaces (84) are correspondingly placed near the negative branches (78). The separation (a) between the surfaces is set generally constant since inductance (L) increases with increased spacing (a) while the electric field (E), which increases for decreased spacing (a), must be kept below the maximum breakdown field for the insulating material used to electrically separate the positive and negative conductor surfaces (82), (84). Thus the optimum spacing (a) is not precisely constant since it is the electric field (E) that should be set everywhere as close as possible to the maximum permitted field (Emax); if the electric field (E) is locally lower than the maximum permitted (Emax), then the electric field (E) should be increased by locally decreasing (a) since then (L) will decrease without requiring an increase in applied voltage (V).

In FIG. 8 the positive conductors (86) are shown with downward sloping cross-hatching, while the negative conductors (88) are shown with upward sloping cross-hatching. This convention will be continued in the following figures.

Figure 9:
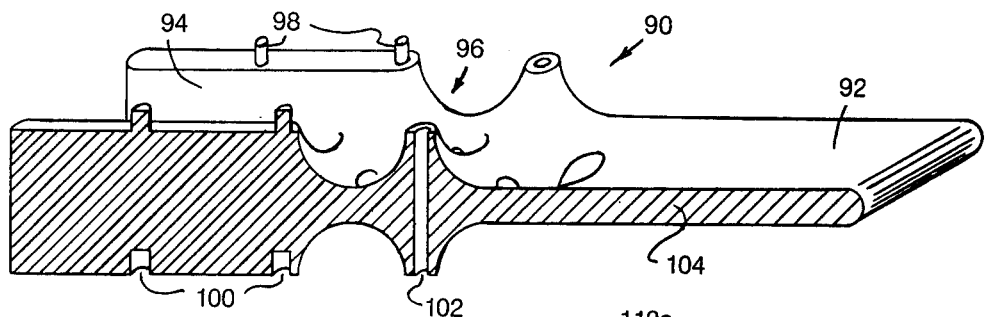
FIG. 9 is an oblique view of a conductor plate used for fabricating a distribution bus having vertical and horizontal bus elements as well as cylindrical elements.

FIG. 9 illustrates that the conductors in FIG. 8 may be fabricated by alternately stacking positive and negative plate-like elements such as the conductor plate generally designated (90) with an insulating material separating the positive plates from the negative plates. The conductor plate (90) also has a coplanar portion (92) and a coaxial portion (94) perpendicular to the coplanar portion (92) that are preferred for directing electrical energy in directions parallel to their conductor surfaces. The portions (96) with cubic symmetry are useful, however, for interfacing the coplanar portions (92) to the coaxial portions (94).

It should be noted that the conductive surfaces of the plate (90) are generally smooth, since it is well known that sharp points on electrostaticly charged conductors result in high concentrations of electric field at the sharp points.

The plate (90) also has pins (98) and pin receptacles (100) for facilitating the alignment of stacked plates (90). Coaxial holes (102) may also be provided for receiving bolts or for directing the passage of coolant. The cross-hatching (104) indicates that the entire plate (90) is solid metal, which is desirable near the reaction chamber (20) for heat conduction. It is otherwise desirable, however, to form the body of the plates (90) out of the same dielectric material as the insulator (not shown) that separates the plates (90) of opposite polarity so that heat conduction is minimized and thermal expansion of the plates (90) will match the thermal expansion of the insulator. The surfaces of the plates (90) may then be coated, for example by electroplating, with a thin layer of conductive metal which is sufficient for electrical conduction because the skin effect causes conduction to occur near the surface of the metal anyway.

The distribution bus (18) preferably has spherical or cylindrical symmetry about the focus point (26) rather than the cubic symmetry of FIG. 8, so that electrical energy in the form of electric (E) and magnetic (H) fields is guided as directly as possible to the focus point (26). A generally cylindrical symmetry about an axis through the focus point (26) simplifies construction by the method of alternately stacking positive and negative coplanar conductor plates perpendicular to the axis.

Figure 10:
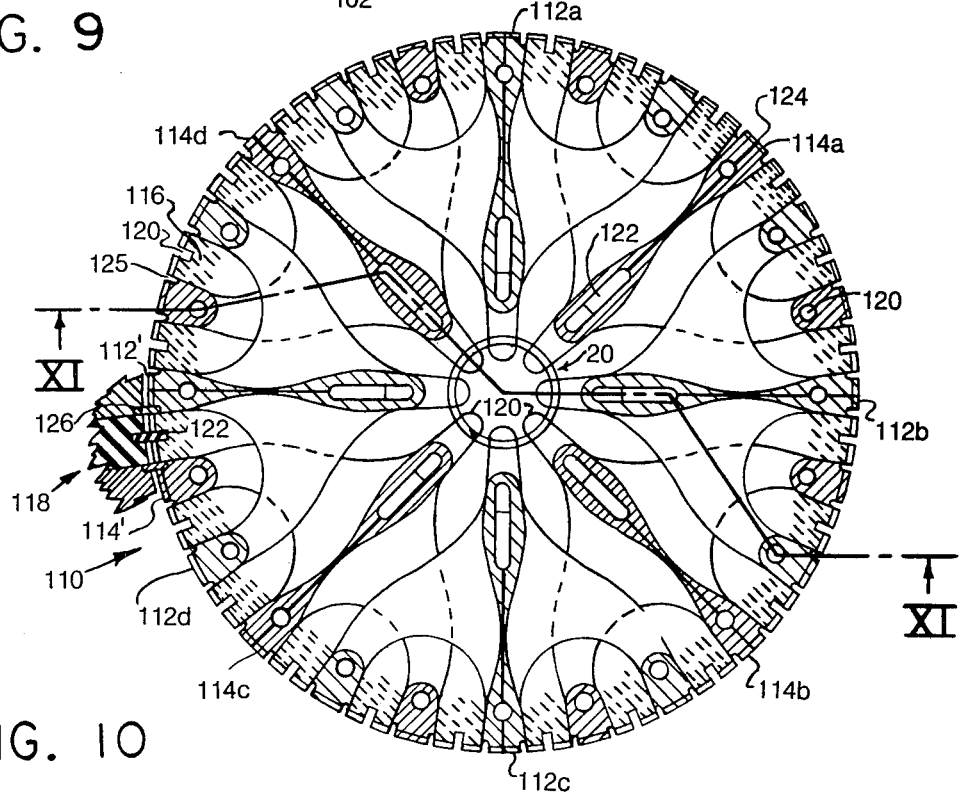
FIG. 10 is a plan section view of a cylindrical geometry distribution bus core along the section line X—X in FIG. 11 further showing means for providing electrical connections around the outer periphery of the core.

As shown in FIGS. 10 and 11, a cylindrical core generally designated (110) surrounds and comprises part of the centrally located plasma focus reaction chamber (20). The positive (112) and negative (114) plates are each sectored into four electrically isolated sectors denoted by reference numerals having suffixes (a), (b), (c) and (d) in FIG. 10, and the plates are further stacked four pairs high denoted by the suffixes (w), (x), (y) and (z) in FIG. 11. The plates are formed with electrode tips (120) generally spherically arranged about the focus point (26), with the negative electrodes (24) shown on top and the positive electrodes (25) below the negative electrodes (24) but offset forty-five degrees with respect to the cylinder axis in order to maximize electrode tip (120) separation and to ensure that the discharge current will diverge in a generally inverse square fashion. The spacing between the positive and negative electrode tips (120) is approximately equal to the radius of the reaction chamber and is also approximately equal to the spacing (a) between the surfaces of the positive (112) and negative (114) plates so that the impedance of the distribution bus (18) will approximately match the impedance of the pinched plasma discharge (28).

The core (110) is shown as a unitary body of conductor plates (112), (114) and insulator (116). For research reactors having a low duty cycle the conductors are, for example, silver-plated copper and the insulator is cast polymethylmethacrylate; high duty cycle power reactors may use molybdenum, tungsten and other refractory metals for conductors and silica, magnesia, alumina, uranium oxide, thorium oxide and other refractory ceramics for the insulator. Hollow sections such as coolant conveying holes (120) and (122) are fabricated using magnesia or silica cores that are chemically or electrochemically removed by weak acid or hydrofluric acid, respectively, or conventional drilling and electrodischarge machining methods may be used instead. If the core (110) is fabricated from refractory metal and insulator it is preferably formed in a heated hydralic press to ensure structural integrity. Note that the problem of providing pressure seals and high structural integrity in assemblies of refractory metal and ceramic subjected to thermal and electrical stress has been solved to some extent by persons skilled in the art of fabricating high power ceramic electron vacuum tubes. Although cracks in the conductors (112), (114) will not result in catastrophic device failure, cracks in the insulator (116) causing short circuits must be avoided. To prevent thermal stress cracking caused by the high thermal gradient for maximum heat conduction from the reaction chamber (20), coaxial radial cuts (124) are made, by sawing or coring with magnesia slabs, in the conductors (112), (114) along coaxial equipotential planes. For high power thermal reactors the radial cuts (124) may be extended to the cylinder axis with the result that the core (110) has eight independent sections. This has the slight disadvantage that the entire core (110) must be pressurized at the pressure of the fuel gas in the reaction chamber (20) to completely avoid sealing difficulties, but such a pressurized core design is feasible since a fuel gas such as deuterium may be used simultaneously as a coolant, spark-gap dielectric gas, and thermonuclear fuel.

The core also has provisions around its outer periphery for further extensions (118) of the distribution bus (18) while maintaining dielectric isolation between the positive and negative electrostatic potentials. The insulator (116) has at least one slot (120) between each positive (112′) and negative (114′) outer coaxial bus element at the outer periphery of the core (110) for receiving an insulator slab such as slab (122) that maintains dielectric isolation while permitting thermal expansion and contraction of the core (110). The positive (112′) and negative (114′) outer coaxial bus elements also have slots (125) to receive conductive connecting slabs (126) for electrically connecting the core (110) to the bus extension (118) also while allowing thermal expansion and contraction of the core (110). As shown in FIG. 11, dielectric isolation at the axial ends (128), (130) of the core (110) is obtained by axial extensions of the insulator (116). Moreover, the reaction chamber is accessible from the ends (128), (130) of the core (110) by an axial hole generally designated (132) that is tapered to the center to receive frustum shaped plugs. Similarly the outer periphery of the core (110) is tapered toward the ends (128), (130) so that the core (110) may be easily molded in a hydralic press.

FIG. 12 illustrates that spark-gap switches may be conveniently built into the coaxial bus elements of the distribution bus (18). A distribution bus (18) having generally cylindrical geometry may be characterized in terms of alternating sets of coaxial and coplanar bus elements in the outward direction; specifically, generally radial electrodes (24), (25) are connected to a first set of coaxial bus elements generally designated (140), which are in turn connected to a first set of coplanar bus elements generally designated (142), which are themselves connected to second coaxial bus elements generally designated (144). The bus (18) can be extended in this fashion to any desired outward radial extent.

As shown in FIG. 12, spark-gap switches generally designated (146) isolate coaxial bars (148) connected to the electrodes (24), (25) from the conductor plates (112), (114). The insulator walls (147) of the switches (146) have coaxial sinuous serrations to increase the length of the surface path from the conductor plates (112), (114) to the bars (148) thereby inhibiting surface leakage currents. Coaxial initiator electrodes (150) surrounded by insulator bars (152) are shown inserted into coaxial holes in the conductor plates for the purpose of initiating breakdown of the dielectric gas in the spark gap switches (146) by injecting a plasma discharge through radial holes (153) in the insulator bars (152) and the conductor plates (114x), (114y), (112x), (112y). The insulator (116) of the core (110′) also has coaxial holes (154) at the top end (128) of the core for receiving cylindrical equalizing resistor rods (shown in black cross-section) for providing equalizing resistors (62), (68) shown in FIGS. 3 and 6 and for providing connections (154) from the conductor bars (148) to the equalizing resistor network to be further described below.

FIGS. 14 and 15 illustrate the use of initiator electrodes (32), (34) in the reaction chamber (20). The positive initiator electrodes (32) are imbedded in an upper frustum insulator plug (160) while the negative initiator electrodes (34) are imbedded in a lower frustum insulator plug (162). Although the use of the fuel gas in the reaction chamber (20) as a dielectric is the simplest method of providing a switching means in the discharge path, it is best suited for low duty cycle operation since the fuel gas pressure must be very high to support the full electrostatic potential (V) which is also applied nearly continuously across the hot walls of the reaction chamber (20).

Figure 16:
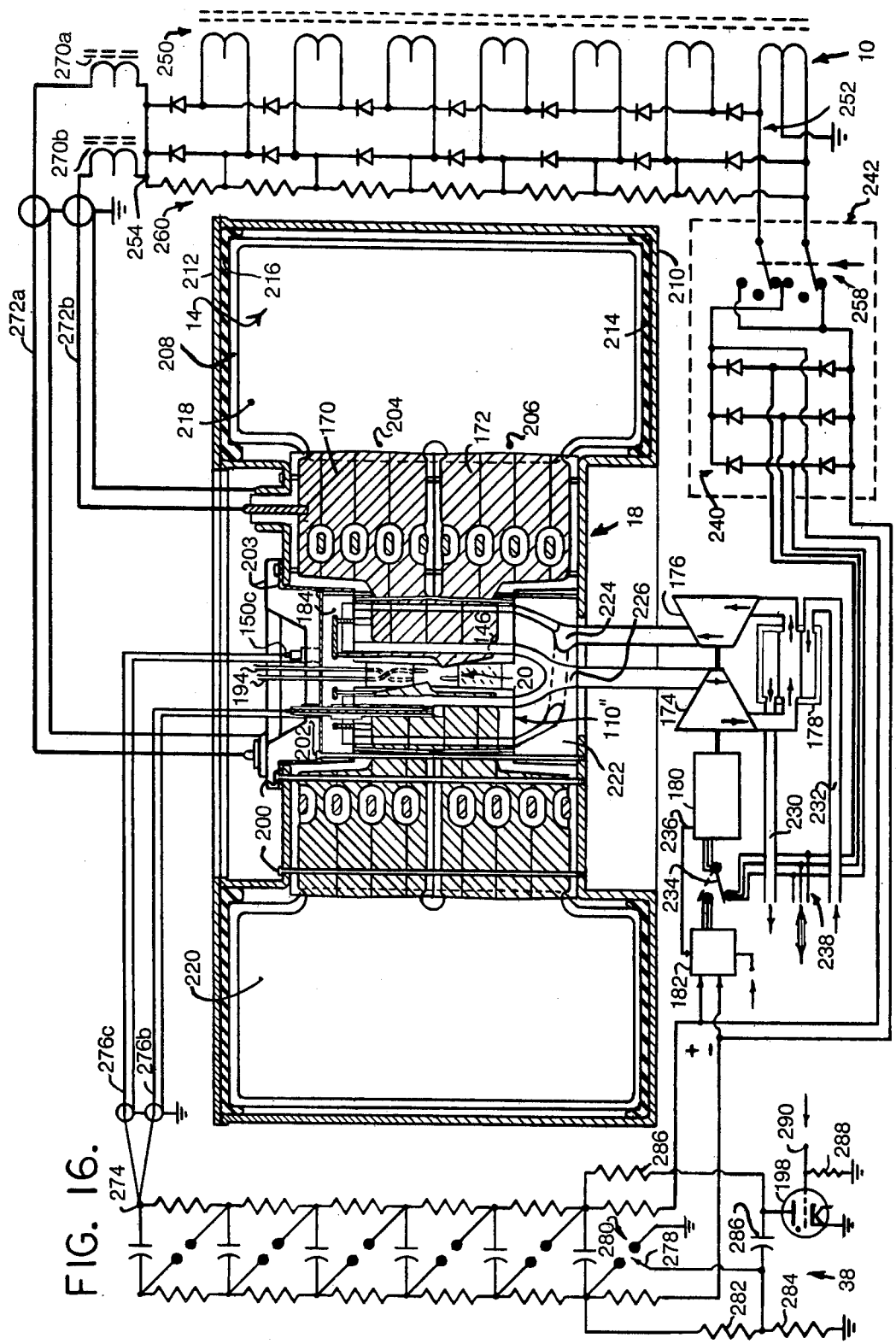
FIG. 16 is an elevation section view along section line XIX—XIX in FIG. 18 of the core of FIG. 10 as modified in FIG. 12 and as interfaced to bus extensions receiving plate capacitors disposed around the outer periphery of the extended bus, and further depicting in schematic form the DC power supply, thermal loop, and control system for a commercial thermonuclear reactor.

FIG. 16 shows a core (110″) used in a high-power thermal reactor system also including a power source (10) shown as an improved high voltage DC-DC converter, an extended distribution bus having an upper portion (170) and a lower portion (172), a capacitor generally designated (14) cylindrically surrounding the core (110″), spark-gap switches (146), initiator electrodes (150) pulsed by a pulse generator (38) shown as a Marx bank, gas turbines (174), (176) for expansion and compression, respectively, a heat exchanger (128), a high-speed alternator (180), and commutating circuits (182) for using the alternator (180) as a motor for initializing the Carnot thermal cycle.

Figure 18:
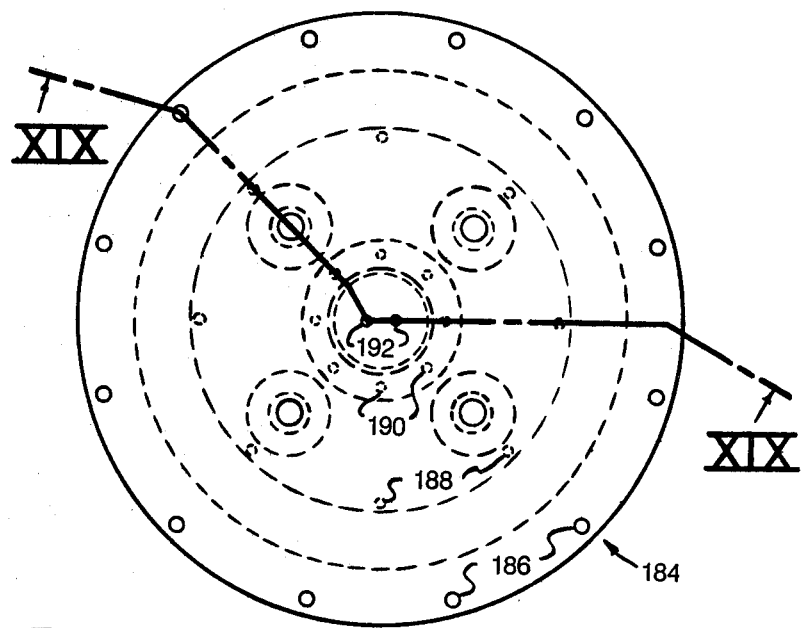
FIG. 18 is a plan view of the header used for providing cooling gas channels and equalizing circuit connections to the core reaction chamber electrodes.
Figure 19:
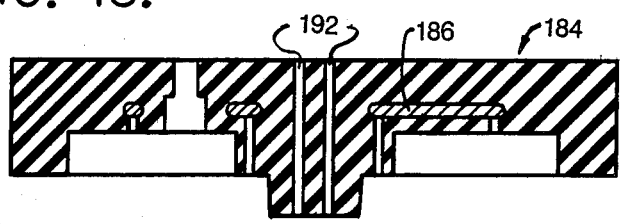
FIG. 19 is an elevation section view of the header along section line XIX—XIX in FIG. 18, further showing the insulator section symbols omitted from FIG. 16 for clarity.

The core (110″) is encircled by the extended distribution bus members (170), (172) and is capped on its top end (128) by a dielectric insulator header (184) shown in detail in FIGS. 18 and 19. The header (184) has an internal conductor (186) for providing connections to equalization resistor bars (66), (68) via holes (188) providing connections to positive and negative conductors (112), (114) and through holes (190) for connections to the coaxial bars (148) of the spark-gap switches (146) via resistor bars (154), the resistor bars being shown in FIG. 12. For simplicity, however, only negative injector electrodes (150) are used rather than both positive and negative injectors as shown in FIG. 12. Holes (192) are also provided in the header (184) for pipes (194) circulating deuterium gas into the reaction chamber (20) from a gas supply (not shown) and back out to a liquification scrubber (not shown) to separate out the helium reaction product and to recirculate the purified deuterium. Stepped holes (196) receive the insulator bars (152) encasing the injectors (150).

It should be noted that the design in FIG. 16 selects the arbitrarily designated potential of the negative plates (114) as a ground potential so that mechanical construction of the design is simplified. Then the bolts (200) clamping the distribution bus sections (170), (172) may be at ground potential and thus isolated from the positive plates in the extended bus sections (170), (172). The bolts (202) clamping the header (184) and a ribbed steel pressure plate (203) through holes (186) in the header (184) are also at ground potential. Thus the only connections to the positive plates (112) are at the outside circumference of the core (110″), a pressurized area, and at the the outer circumference of the extended bus sections (170), (172) for connecting to flat leads (204), (206) of the plate capacitors (208) which in total comprise the capacitor (14). The plate capacitors (208) sit in a steel tank (210) having a lid (212). Silicone rubber insulators (214), (216) isolate the capacitors (208) from the tank (210) and lid (212), respectively. The tank (210) is filled with dielectric oil and is slightly pressurized to prevent discharge across the positive (218) and negative (220) conductor plates of the plate capacitors (208).

The core (110″) is capped on the bottom (130) by a gas distributor (222) having gas inlet passages (224) and gas outlet passages (226) which interface to the holes (122), (120) in the core (110″) and along with an indentation (228) in the header (184) these passages form a complete coolant gas circuit directing coolant gas from the outer passages (120) of the core (110″) to the inner passages (122). It should be noted that as drawn FIG. 16 illustrates that the gas in the reaction chamber (20) may be isolated from the coolant and spark-gap dielectric gas, but passages could be easily provided to direct the flow of coolant gas through the reaction chamber (20).

The heated coolant gas expands in the expansion turbine (174) and cools in the heat exchanger (178) giving up heat to generate steam sent to a conventional turbine (not shown) via an outlet pipe (230) from water fed into the heat exchanger (178) via an inlet pipe (232). From the heat exchanger (178) the gas passes through the compression turbine (176) to complete the Carnot cycle. Excess mechanical energy from the turbines (174), (176) drives the three-phase high speed alternator (180). The Carnot cycle is initialized, however, by switching a starting switch (234) to the dashed position so that the stator coils of the alternator (180) are driven by the electronic commutator (182) depending on the position of the alternator's (180) rotor as signalled on the control line (236) receiving a position signal from sensors in the alternator (180). During initialization AC power is received from bi-directional power lines generally designated (238) and is converted to DC by a three-phase bridge rectifier generally designated (240) that is part of a frequency converter (242) for exciting the HVDC power supply (10).

Figure 17:
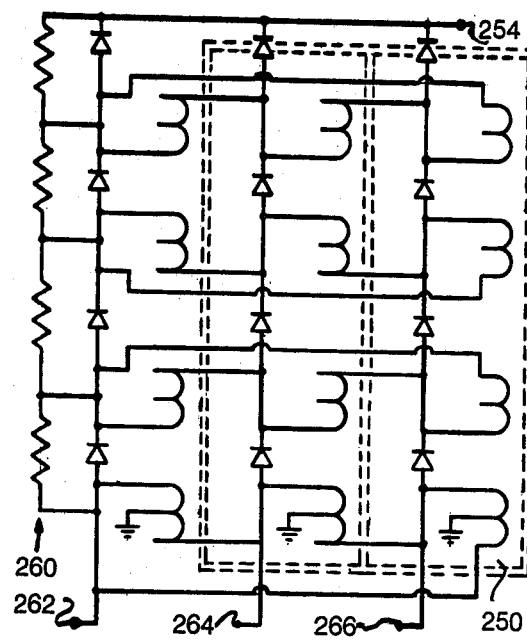
FIG. 17 is a schematic of a three-phase resonant DC power supply using full-wave rectifier diodes built into the coils.

The power supply has an induction coil generally designated (250) having a plurality of isolated secondary coil sections; preferably a very large number of secondary coil sections are used rather than 6 as shown. Rectifier diodes generally designated (252) provide full-wave rectifiction of the AC output of each secondary coil section. Since the AC voltage on the secondary coil is limited to the AC voltage on each individual secondary coil section, the net parasitic capacitance between secondary coil sections is eliminated and the self-resonant frequency of the secondary coil is increased to the self-resonant frequency of the individual secondary coil sections, thus maximizing the rate of power transfer through the induction coil (250) when the switching modulator (258) of the frequency converter (242) is driven at the resonant frequency. The induction coil (250) sections are preferably single layer coils to eliminate the increased capacitance of the multilayer coils, and in fact should have only a few turns per section to further eliminate parasitic coapcitance. Some capacitance, however, may be desirable so that the induction coil (250) has a sufficiently high quality factor so that the switching modulator (258), for example a class-C push-pull RF amplifier, has a reasonably high efficiency. The power supply (10) also has equalizing resistors (260) to prevent uneven reverse voltage buildup on the rectifier diodes (254). Preferably a three-phase induction coil (250) is used for high duty-cycle operation, such as the delta configuration in FIG. 17, so that the power transfer from the three phase AC inputs (262), (264), (266) to the positive DC output node (254) is generally continuous.

Chokes (270) isolate the supply node (254) form the isolated sections (a), (b), (c), (d) of the distribution bus (18) fed via coaxial cables (272).

A Marx bank pulse generator (38) generates a high negative voltage pulse at an output node (274) that is distributed to the injector electrodes (150) via coaxial cables (276). The Marx bank is fired via an initiator electrode (278) near the first spark-gap (280) of the Marx bank (36), pulsed by a pulse generator comrising the thyratron (198), biasing resistors (282), (284), a pulse charge storage capacitor (286), a charging resistor (286), and a thyratron grid-leak resistor (288). The thyratron (198) is a convenient device for generating an initiating pulse since it may be triggered by a relatively low voltage, low current positive pulse to its grid input (290).

Persons skilled in the art of high voltage devices undoubtedly know that the preferred embodiment may be modified in various ways while still achieving the advantages of the present invention over prior art methods. Although the core (110) was shown with four sections, three, five, or more sections could be used without significant detriment until so many sections are used that the discharge current density no longer diverges form the reaction chamber in a generally inverse-square fashion. Furthermore, the advantages of the present invention are due to the geometry of the magnetic and electric fields as defined by the conductor surfaces and thus the geometric appearance of the reactor components such as the core (110) are irrelevant to the improvement which is defined by equations (13)–(29). Specifically, the ratio of V/L for L defined in equation (21) is a measure of whether the magnetic field (H) diverges generally as the inverse-square of the outward radial distance, with equation (29) giving the optimum value of V/L for the case of ideal divergence as the inverse square of the outward radial distance. Qualitatively, the divergence at locations near the reaction chamber (20) is proportionally more of a factor in determining the general divergence of the discharge current than the divergence at locations away from the reaction chamber.

I claim:

1. A plasma focus fusion reactor having a reaction chamber containing material capable of fusion and having at least two electrodes, a high voltage power supply, means for receiving and storing charge supplied by the high voltage power supply, means for conducting the charge from the means for receiving and storing the charge to the reaction chamber and having positive conductors conducting the charge to at least one of the electrodes designated as positive and negative conductors receiving the charge from at least one different electrode designated as negative and returning the charge to the means for storing the charge thereby defining a discharge circuit comprising the means for receiving and storing the charge and the reaction chamber and including a path through the reaction chamber between the positive and negative electrodes, switching means for providing a relatively high series resistance in the discharge circuit while the high voltage power supply is delivering charge to the means for receiving and storing the charge and for providing a relatively low series resistance in the discharge circuit after the means for receiving and storing the charge has received charge from the high voltage power supply, the rate of increase in the discharge current in the reaction chamber after the switching means closes and the maximum value of the discharge current being limited by the inductance associated with the discharge circuit, the discharge current in the reaction chamber ionizing said material capable of fushion thereby creating plasma and pinching the plasma at a focus point between the positive and negative electrodes and initiating fusion reactions, the total energy released by the fushion reactions being an increasing function of the rate of increase in the discharge current in the reaction chamber after the switching means closes and an increasing function of the maximum value of the discharge current, wherein the improvement comprises:

said means for conducting the charge comprises distribution circuit means, generally spherically surrounding the focus point, for conveying the discharge current so that the magnitude of the magnetic field intensity within the dielectric material and generated by the discharge current is generally proportional to the inverse square of the distance from the focus point so that the intital rate of increase in the discharge current in the reaction chamber after the switching means closes exceeds forty megaamperes per microsecond.

2. The plasma focus fusion reactor as claimed in claim 1, wherein the total inductance associated with the discharge circuit, less the inductance associated with the discharge path through the reaction chamber between the positive and negative electrodes, is approximately $(\mu a)/(2\pi)$, $\mu$ being the magnetic permeability of free space and a being the radius from the focus point to the electrode tips, the inductance of the source of electrical energy fed to the plasma thereby approximately matching the inductance of the plasma as it is pinched and thereby approximately maximizing power transfer.

3. The plasma focus fusion reactor as claimed in claim 1, wherein the surfaces of the positive and negative electrical conductors in the distribution circuit means are separated by a generally uniform distance and branch generally radially outward from the focus point in a three dimensional, interpenetrating fashion with the surfaces of the positive conductors generally surrounding the surfaces of the negative conductors and the surfaces of the negative conductors generally surrounding the surfaces of the positive conductors, and in which the branching occurs a plurality of times in the generally outward direction from the focus point.

4. The plasma focus fusion reactor as claimed in claim 3, wherein the generally uniform distance of separation between the positive and negative conductors is approximately a, the radius from the focus point to the electrode tips.

5. The plasma focus fusion reactor as claimed in claim 3, wherein the reaction chamber has a plane approximately passing through the focus point, and wherein the reaction chamber includes at least three but not more than twelve positive electrodes and approximately an equal number of negative electrodes, the positive electrodes being separated by a generally uniform distance from the negative electrodes, the positive electrodes being disposed on one side of the plane and the negative electrodes being disposed on the opposite side of the plane.

6. The plasma focus fusion reactor as claimed in claim 5, wherein there are exactly four positive electrodes and exactly four negative electrodes, the negative electrodes being circumferentially offset from the positive electrodes, the positive and negative electrodes being disposed at approximately forty-five degree intervals around the axis through the focus point that is perpendicular to the plane.

7. The plasma focus fusion reactor as claimed in claim 5, wherein a plurality of the electrodes are electrically isolated from the other electrodes of the same polarity, and the conductors connecting the means for receiving and storing the charge to the isolated electrodes are themselves electrically isolated from the other conductors.

8. The plasma focus fusion reactor as claimed in claim 7, wherein the switching means comprises spark-gap switches electrically connected directly in series with a plurality of isolated electrodes including both isolated positive electrodes and isolated negative electrodes.

9. The plasma focus fusion reactor as claimed in claim 3, wherein the distribution circuit means has a generally cylindrical geometry about a central axis, and the positive and negative conductors are comprised of alternating sets, progressing in an outward radial direction from the central axis, of coaxial conductor elements generally planar in planes including the central axis, and of coplanar conductor elements generally in planes perpendicular to the central axis.

10. The plasma focus fusion reactor as claimed in claim 9, wherein the positive and negative electrical conductors are comprised of positive and negative coplanar plates, respectively, that are alternately stacked in coplanar fashion in the axial direction, and in which the coplanar plates have means for forming the coaxial conductor elements when the coplanar plates are alternately stacked.

11. The plasma focus fusion reactor as claimed in claim 9, wherein the distribution circuit means comprise at least one substantially unitary core section comprising both positive and negative, and both coaxial and coplanar, conductor elements and separating dielectric material.

12. The plasma focus fusion reactor as claimed in claim 1, wherein the improvement further comprises said high voltage power supply being a DC power supply of the type having at least one primary coil excited by an alternating voltage at a predetermined frequency, and a secondary coil assembly inductively coupled to said primary coil and resonating at approximately the frequency of said alternating voltage, the secondary coil assembly having at least one hundred times the number of turns as the number of turns in the primary coil, the secondary coil assembly having means for rectifying the induced alternating current and thereby generating a direct current at a voltage of at least approximately one hundred times greater than the amplitude of the alternating voltage exciting the primary coil, said further improvement being for reducing the parasitic capacitance in the secondary coil assembly which inherently limits the resonant frequency of the secondary coil assembly and thereby limits the rate of power transfer from the primary coil to the secondary coil assembly, wherein the further improvement comprises:

the secondary coil assembly having at least ten isolated secondary coil sections each having resonant frequencies of approximately the frequency of the alternating voltage exciting the primary coil, each isolated secondary coil section having an associated means for rectifying the alternating current induced in the secondary coil section, the rectified outputs of said associated means for rectifying being connected in series to thereby generate the output of the DC power supply.

13. The plasma focus fusion reactor as claimed in claim 12, wherein the associated means for rectifying comprise directional diodes, each terminal of each secondary coil section being connected through at least one directional diode to the opposite polarity terminal of each of the two adjacent secondary coil sections in said series circuit generating the output of the DC power supply.

14. A plasma focus fusion reactor having a reaction chamber containing material capable of fusion and having at least two electrodes, a high voltage power supply, means for receiving and storing charge supplied by the high voltage power supply, means for conducting the charge from the means for receiving and storing the charge to the reaction chamber and having positive conductors conducting the charge to at least one of the electrodes designated as positive and negative conductors receiving the charge from at least one different electrode designated as negative and returning the charge to the means for storing the charge thereby defining a discharge circuit comprising the means for receiving and storing the charge and the reaction chamber and including a path through the reaction chamber between the positive and negative electrodes, switching means for providing a relatively high series resistance in the discharge circuit while the high voltage power supply is delivering charge to the means for receiving and storing the charge and for providing a relatively low series resistance in the discharge circuit after the means for receiving and storing the charge has received charge from the high voltage power supply, the rate of increase in the discharge current in the reaction chamber after the switching means closes and the maximum value of the discharge current being limited by the inductance associated with the discharge circuit, the discharge current in the reaction chamber ionizing said material capable of fusion thereby creating plasma and pinching the plasma at a focus point between the positive and negative electrodes and initiating fusion reactions, the total energy released by the fusion reactions being an increasing function of the rate of increase in the discharge current in the reaction chamber after the switching means closes and an increasing function of the maximum value of the discharge current, wherein the improvement comprises:

said means for conducting the charge comprises distribution circuit means, generally spherically surrounding the focus point, for conveying the discharge current so that the magnitude of the magnetic field intensity within the dielectric material and generated by the discharge current is generally proportional to the inverse square of the distance from the focus point, and wherein the surfaces of the positive and negative electrical conductors in the distribution circuit means are separated by a generally uniform distance and branch generally radially outward from the focus point in a three dimensional, interpenetrating fashion with the surfaces of the positive conductors generally surrounding the surfaces of the negative conductors and the surfaces of the negative conductors generally surrounding the surfaces of the positive conductors, and in which the branching occurs a plurality of times in the generally outward direction from the focus point.

15. The plasma focus fusion reactor as claimed in claim 14, wherein the reaction chamber has a plane approximately passing through the focus point, and wherein the reaction chamber includes at least three but not more than twelve positive electrodes and approximately an equal number of negative electrodes, the positive electrodes being separated by a generally uniform distance from the negative electrodes, the positive electrodes being disposed on one side of the plane and the negative electrodes being disposed on the opposite side of the plane.

16. The plasma focus fusion reactor as claimed in claim 15, wherein there are exactly four positive electrodes and exactly four negative electrodes, the negative electrodes being circumferentially offset from the positive electrodes, the positive and negative electrodes being disposed at approximately forty-five degree intervals around the axis through the focus point that is perpendicular to the plane.

17. The plasma focus fusion reactor as claimed in claim 15, wherein a plurality of the electrodes are electrically isolated from the other electrodes of the same polarity, and the conductors connecting the means for receiving and storing the charge to the isolated electrodes are themsleves electrically isolated from the other conductors.

18. The plasma focus fusion reactor as claimed in claim 17, wherein the switching means comprise switches electrically connected in series with a plurality of isolated electrodes including both isolated positive electrodes and isolated negative electrodes.

19. The plasma focus fusion reactor as claimed in claim 14, wherein the distribution circuit means has a generally cylindrical geometry about a central axis, and the positive and negative conductors are comprised of alternating sets, progressing in an outward radial direction from the central axis, of coaxial conductor elements generally planar in planes including the central axis, and of coplanar conductor elements generally in planes perpendicular to the central axis.

20. The plasma focus fusion reactor as claimed in claim 19, wherein the positive and negative electrical conductors are comprised of positive and negative coplanar plates, respectively, that are alternately stacked in coplanar fashion in the axial direction, and in which the coplanar plates have means for forming the coaxial conductor elements when the coplanar plates are alternately stacked.

21. The plasma focus fusion reactor as claimed in claim 20, wherein the distribution circuit means comprise at least one substantially unitary core section comprising both positive and negative, and both coaxial and coplanar, conductor elements and separating dielectric material.

22. The plasma focus fusion reactor as claimed in claim 14, wherein the improvement further comprises said high voltage power supply being a DC power supply of the type having at least one primary coil excited by an alternating voltage at a predetermined frequency, and a secondary coil assembly inductively coupled to said primary coil and resonating at approximately the frequency of said alternating voltage, the secondary coil assembly having at least one hundred times the number of turns as the number of turns in the primary coil, the secondary coil assembly having means for rectifying the induced alternating current and thereby generating a direct current at a voltage of at least approximately one hundred times greater than the amplitude of the alternating voltage exciting the primary coil, said further improvement being for reducing the parasitic capacitance in the secondary coil assembly which inherently limits the resonant frequency of the secondary coil assembly and thereby limits the rate of power transfer from the primary coil to the secondary coil assembly, wherein the further improvement comprises:

the secondary coil assembly having at least ten isolated secondary coil sections each having resonant frequencies of approximately the frequency of the alternating voltage exciting the primary coil, each isolated secondary coil section having an associated means for rectifying the alternating current induced in the secondary coil section, the rectified outputs of said associated means for rectifying being connected in series to thereby generate the output of the DC power supply.

23. The improvement for a high voltage DC power supply of the type having at least one primary coil excited by an alternating voltage at a predetermined frequency, and a secondary coil assembly inductively coupled to said primary coil and resonating at approximately the frequency of said alternating voltage, the secondary coil assembly having at least one hundred times the number of turns as the number of turns in the primary coil, the secondary coil assembly having means for rectifying the induced alternating current and thereby generating a direct current at a voltage of at least approximately one hundred times greater than the amplitude of the alternating voltage exciting the primary coil, said further improvement being for reducing the parasitic capacitance in the secondary coil assembly which inherently limits the resonant frequency of the secondary coil assembly and thereby limits the rate of power transfer from the primary coil to the secondary coil assembly, wherein the further improvement comprises:

the secondary coil assembly having at least ten isolated secondary coil sections each having resonant frequencies of approximately the frequency of the alternating voltage exciting the primary coil, each isolated secondary coil section having an associated means for rectifying the alternating current induced in the secondary coil section, the rectified outputs of said associated means for rectifying being connected in series to thereby generate the output of the DC power supply.

24. The plasma focus fusion reactor as claimed in claim 23, wherein the associated means for rectifying comprise directional diodes, each terminal of each secondary coil section being connected through at least one directional diode to the opposite polarity terminal of each of the two adjacent secondary coil sections in said series circuit generating the output of the DC power supply.

* * * * *